United States Patent
Watabe et al.

(10) Patent No.: US 10,448,452 B2
(45) Date of Patent: Oct. 15, 2019

(54) MOBILE BODY COMMUNICATION SYSTEM AND MOBILE BODY COMMUNICATION METHOD

(71) Applicant: SoftBank Corp., Tokyo (JP)

(72) Inventors: Yukitoshi Watabe, Tokyo (JP); Manabu Shindachiya, Tokyo (JP); Yosuke Komiyama, Tokyo (JP); Satoshi Watanabe, Tokyo (JP)

(73) Assignee: SOFTBANK CORP., Tokyo (JP)

( * ) Notice: Subject to any disclaimer, the term of this patent is extended or adjusted under 35 U.S.C. 154(b) by 0 days.

(21) Appl. No.: 15/021,938

(22) PCT Filed: Dec. 22, 2015

(86) PCT No.: PCT/JP2015/085804
§ 371 (c)(1),
(2) Date: Mar. 14, 2016

(87) PCT Pub. No.: WO2016/151967
PCT Pub. Date: Sep. 29, 2016

(65) Prior Publication Data
US 2018/0116010 A1    Apr. 26, 2018

(30) Foreign Application Priority Data

Mar. 23, 2015 (JP) ................. 2015-060062

(51) Int. Cl.
*H04W 4/00* (2018.01)
*H04W 84/10* (2009.01)
(Continued)

(52) U.S. Cl.
CPC .......... *H04W 84/10* (2013.01); *H04W 16/32* (2013.01); *H04W 28/06* (2013.01); *H04W 28/16* (2013.01);
(Continued)

(58) Field of Classification Search
CPC .................. H04W 84/10; H04W 16/32
See application file for complete search history.

(56) References Cited

U.S. PATENT DOCUMENTS

| 2006/0105773 | A1* | 5/2006 | Lin | H04W 74/02 455/452.1 |
| 2011/0287775 | A1* | 11/2011 | Fan | H04W 72/082 455/452.1 |

(Continued)

FOREIGN PATENT DOCUMENTS

| JP | 5456874 | 4/2014 | |
| WO | WO-2014177075 A1 * | 11/2014 | .......... H04W 76/022 |

OTHER PUBLICATIONS

WIPO, International Search Report for PCT/JP2015/085804, dated Mar. 8, 2016.

*Primary Examiner* — Hassan Kizou
*Assistant Examiner* — Deepa Belur

(57) ABSTRACT

A mobile body communication system includes: a home base station that controls radio communication with a mobile unit; a macro cell base station that controls radio communication with one or more mobile units and radio communication with the home base station; and a quality control server QCS that is connected to the macro cell base station and manages communication quality between the macro cell base station and the home base station, wherein the quality control server QCS: additionally generates a session between the home base station and the macro cell base station when receiving a session generation request from the home base station; and releases the session between the home base station and the macro cell base station when receiving a session release request from the home base station. Communication quality in a radio network between the mobile unit(s) and the macro cell base station can be guaranteed.

6 Claims, 9 Drawing Sheets

(51) Int. Cl.
  *H04W 16/32* (2009.01)
  *H04W 28/16* (2009.01)
  *H04W 28/06* (2009.01)
  *H04W 76/34* (2018.01)
  *H04W 76/15* (2018.01)
  *H04W 84/04* (2009.01)

(52) U.S. Cl.
  CPC ........... *H04W 76/15* (2018.02); *H04W 76/34* (2018.02); *H04W 84/045* (2013.01)

(56) References Cited

U.S. PATENT DOCUMENTS

| | | | |
|---|---|---|---|
| 2012/0149377 A1* | 6/2012 | Su | H04W 36/0011 455/438 |
| 2013/0012249 A1* | 1/2013 | Centonza | H04W 72/0426 455/501 |
| 2014/0024375 A1* | 1/2014 | Fitzpatrick | H04W 36/30 455/436 |
| 2014/0248881 A1* | 9/2014 | Xu | H04W 36/0033 455/436 |
| 2014/0269632 A1* | 9/2014 | Blankenship | H04W 76/15 370/329 |
| 2015/0271835 A1* | 9/2015 | Shaw | H04W 76/12 455/452.2 |
| 2016/0219467 A1* | 7/2016 | Endo | H04W 24/04 |
| 2016/0249255 A1* | 8/2016 | Khawer | H04M 15/66 |
| 2017/0048752 A1* | 2/2017 | Xiong | H04W 24/02 |
| 2017/0111829 A1* | 4/2017 | Ye | H04W 36/14 |

* cited by examiner

Fig.9

| QCI | Bit Rate Guarantee | Priority | Permissible Delay | Loss Rate | Application |
|---|---|---|---|---|---|
| 1 | GBR | 2 | 100ms | 1.00E-02 | VoIP |
| 2 | GBR | 4 | 150ms | 1.00E-03 | Video call |
| 3 | GBR | 5 | 300ms | 1.00E-06 | Streaming |
| 4 | GBR | 3 | 50ms | 1.00E-03 | Real-time Game |
| 5 | Non-GBR | 1 | 100ms | 1.00E-06 | IMS Signaling |
| 6 | Non-GBR | 7 | 100ms | 1.00E-03 | Interactive Game |
| 7 | Non-GBR | 6 | 300ms | 1.00E-06 | TCP Protocol (browsing, e-mail, and file downloading) |
| 8 | Non-GBR | 8 | 300ms | 1.00E-06 | |
| 9 | Non-GBR | 9 | 300ms | 1.00E-06 | |

MOBILE BODY COMMUNICATION SYSTEM AND MOBILE BODY COMMUNICATION METHOD

CROSS-REFERENCE TO RELATED APPLICATION(S)

This application is a National Phase application under 35 U.S.C. § 371 of PCT Application PCT/JP2015/085804, filed Dec. 22, 2015, which claims priority to Japanese Patent Application No. 2015-060062, filed Mar. 23, 2015, which are all hereby incorporated by reference.

TECHNICAL FIELD

The present invention relates to a mobile body communication system for relaying packet communication between a mobile unit(s) and a macro cell base station.

BACKGROUND ART

LTE (Long Term Evolution) has been becoming widespread in place of third generation mobile communication systems (3G: 3rd Generation) as a normalization standard for communication systems. LTE is a communication standard that supports only packet communication, and voices are converted to packets according to VoIP (Voice over Internet Protocol) and then transmitted and received. Particularly, VoIP according to the LTE standard is called VoLTE (Voice over LTE).

With a mobile body communication system, a home base station (femto cell (Femto Cell) base station) is installed to relay communication between a mobile unit(s) and a macro cell base station in order to secure communication quality inside buildings. Conventionally, fixed lines are used for communication from the home base station to a core network including the macro cell base station (for example, see PTL 1).

CITATION LIST

Patent Literature

[PTL 1] Japanese Patent No. 5456874

BRIEF SUMMARY

Problems to be Solved by the Invention

Under this circumstance, when the fixed lines are used as backhaul (Backhaul) as in the technology described in PTL 1, there is a problem requiring time to lay the fixed lines as well as the running cost for the fixed lines. Therefore, the use of a radio means for backhaul communication is suggested as described in a prior application (Japanese Patent Application No. 2015-051496) from the applicant of the present application.

However, since the macro cell base station is to directly conduct radio communication with the mobile units, if the backhaul communication of the home base station is also conducted by radio, there is a possibility that resources to be allocated to the mobile unit(s) directly connected with the macro cell base station may be reduced, thereby communication quality degrades. Contrarily, if traffic for the mobile unit(s) directly connected to the macro cell base station increases, the resources to be allocated to the backhaul communication with the home base station become insufficient, which may cause the problem of quality degradation in the mobile unit(s) connected via the home base station.

Accordingly, the present invention was devised in light of the above-described circumstances and it is one of its objects to guarantee communication quality by dynamically controlling communication traffic volume in a radio network between the mobile unit(s) and the macro cell base station.

Means for Solving the Problems (1) In order to achieve the above-described object, a mobile body communication system according to the present invention includes: a home base station that controls radio communication with a mobile unit; a macro cell base station that controls radio communication with one or more mobile units and radio communication with the home base station; and a quality control server that is connected to the macro cell base station and manages communication quality between the macro cell base station and the home base station, wherein the quality control server: generates a session between the home base station and the macro cell base station when receiving a session generation request from the home base station; and releases the session between the home base station and the macro cell base station when receiving a session release request from the home base station.

A mobile body communication method according to the present invention includes: a home base station that controls radio communication with a mobile unit; a macro cell base station that controls radio communication with one or more mobile units and radio communication with the home base station; and a core network that controls the macro cell base station, wherein in the core network, a session between the home base station and the macro cell base station is generated when a session generation request is received from the home base station; and the session between the home base station and the macro cell base station is released when a session release request is received from the home base station.

The present invention may have the following configurations as desired.

(2) The mobile body communication system further includes a packet data network gateway connected to the macro cell base station, wherein the quality control server: generates the session by controlling the packet data network gateway when receiving the session generation request; and releases the session by controlling the packet data network gateway when receiving the session release request.

(3) The quality control server releases the session which is established when communication with the home base station fails.

(4) The home base station: transmits the session generation request to the quality control server when a call from the mobile unit starts; and transmits the session release request to the quality control server when the call from the mobile unit terminates.

(5) The quality control server: increases a guaranteed bandwidth of the session when receiving a session change request from the home base station in association with an increase in the number of calls from the mobile body; and decreases the guaranteed bandwidth of the session when receiving a session change request from the home base station in association with a decrease in the number of calls from the mobile body.

(6) The home base station: transmits the session change request to the quality control server in association with the increase in the number of calls when the number of calls from the mobile unit has increased; and transmits the session change request to the quality control server in association with the decrease in the number of calls when the number of calls from the mobile unit has decreased.

Advantageous Effects of Invention

According to the present invention, a session between the home base station and the macro cell base station is generated when the necessity to generate the session is realized on a core network side in response to a session generation request from a radio network side; and the session between the home base station and the macro cell base station is released when it is realized on the core network side that the session is no longer required, in response to a session release request from the radio network side. Therefore, according to the present invention, the generation and release of the session(s) are managed depending on whether there is an outgoing call at the home base station or not, and both the communication quality of the mobile unit(s) connected to the home base station and the communication quality of the mobile unit(s) connected to the macro cell base station can be controlled appropriately.

BRIEF DESCRIPTION OF THE DRAWINGS

FIG. 9 illustrates a list of the QCI parameters.

DETAILED DESCRIPTION OF THE INVENTION

Figure 1:
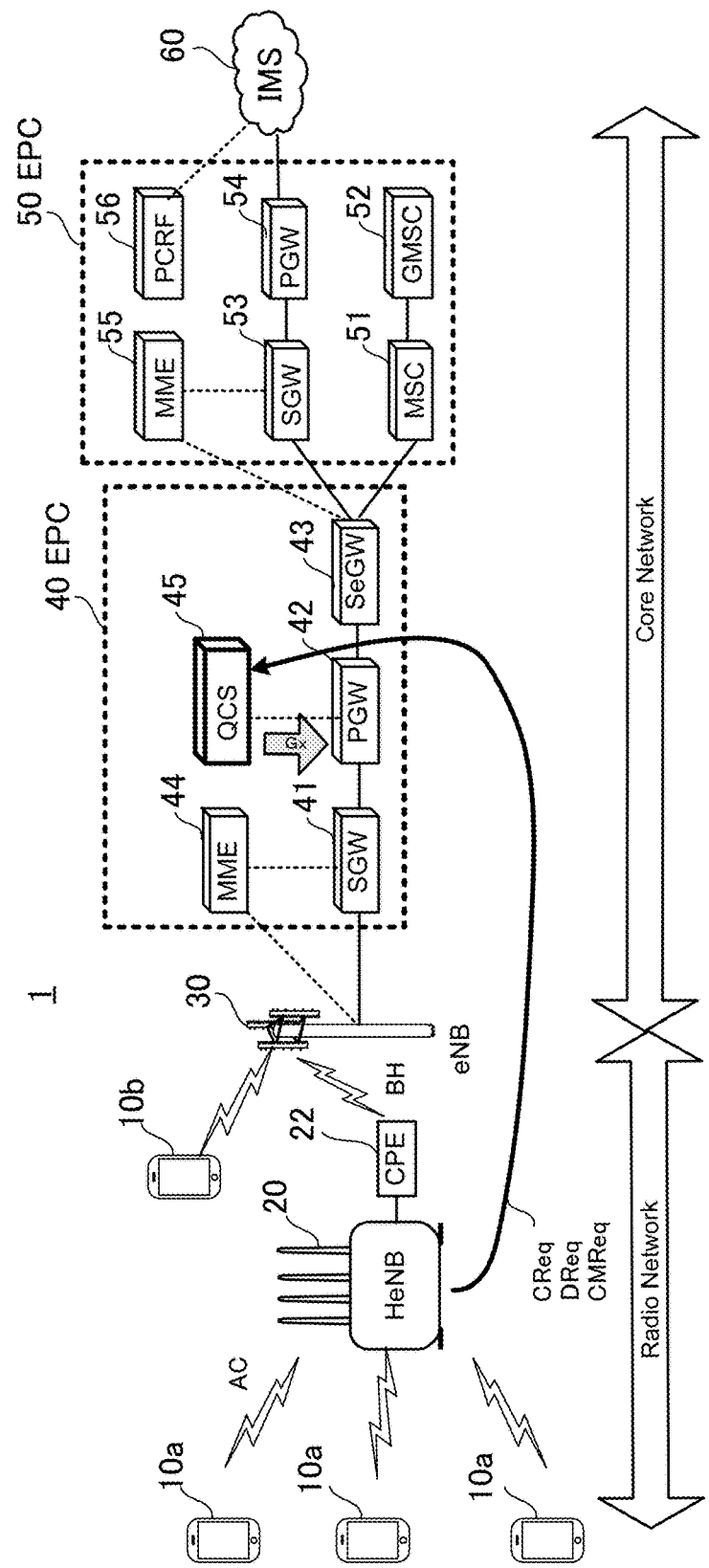
FIG. 1 is a configuration diagram of a mobile body communication system according to an embodiment of the present invention.

One embodiment of the present invention will be explained below with reference to drawings. However, the embodiment explained below is just for illustration and is not intended to exclude applications of various variations or technologies which are not clearly specified below. In other words, the present invention can be implemented in various variations within the range not departing from the gist of the invention. Furthermore, in descriptions of a series of drawings, the same or similar reference numeral is assigned to the same or similar parts.

Configuration of Mobile Body Communication System

FIG. 1 illustrates a configuration diagram of a mobile body communication system according to an embodiment of the present invention. The mobile body communication system according to this embodiment is configured by including a radio network and a core network.

(Radio network) Referring to FIG. 1, a mobile body communication system 1 according to this embodiment includes, as the configuration relating to the radio network, mobile bodies 10, a home base station 20, customer premises equipment CPE 22, and a macro cell base station (MCC: Macro Cell) 30. The radio network is called E-UTRAN (Evolved Universal Terrestrial Radio Access Network) according to the LTE standard.

The mobile bodies 10 are mobile portable communication terminals such as a smartphone or a cell phone and are called UE (User Equipment). FIG. 1 shows that a mobile body which is present within a communicable range of the home base station 20 and is connected to the home base station 20 is indicated as a mobile body 10a; and a mobile body which is present within a communicable range of the macro cell base station 30 and is directly connected to the macro cell base station 30 is indicated as a mobile body 10b. The mobile bodies 10a and 10b will be hereinafter collectively referred to as the mobile bodies 10.

The home base station 20 is also called a femto base station, also called HeNB (Home eNodeB) according to the LTE standard, and constitutes one node in the radio network. The home base station 20 establishes radio communication with the mobile units 10 and provides the mobile units 10 with packet communication services (such as voice packet communication services and multimedia services). The radio communication between the home base station 20 and the mobile units 10 is also called an access link AC (Access Link). A cell formed by the home base station 20 has a cell size smaller than that of the macro cell base station 30 and constructs a communication area of a radius ranging from several meters to several tens of meters. The home base station 20 establishes radio communication with the macro cell base station 30 via customer premises equipment CPE (Customer Premises Equipment) 22. The radio communication between the customer premises equipment CPE 22 and the macro cell base station 30 is also called backhaul BH (Backhaul). The customer premises equipment CPE 22 may be configured integrally with the home base station 20.

The macro cell base station 30 is also called eNB (eNodeB) and establishes radio communication with the home base station 20 via the customer premises equipment CPE 22. The macro cell base station 30 constructs a communication area of a radius ranging from several hundreds of meters to a dozen kilometers or so.

(Core Network) Furthermore, as illustrated in FIG. 1, the mobile body communication system 1 includes, as the configuration relating to the core network, a first core network EPC (Evolved Packet Core) 40, a second core network EPC 50, and an IP multimedia subsystem IMS (IP Multimedia Subsystem) 60. Incidentally, this embodiment will be explained as including the first core network 40 and the second core network 50, but the system may be configured by including only one core network.

The first core network EPC 40 includes a signaling gateway SGW (Signaling Gateway) 41, a packet data network gateway PGW (Packet Data Network Gateway) 42, a security gateway SeGW (Security Gateway) 43, a mobility management entity MME (Mobility Management Entity) 44, and a quality control server QCS (Quality Control Server) 45.

The signaling gateway SGW 41 is a device that functions as a gateway handling a user plane of customer data within the first core network 40.

The packet data network gateway PGW 42 is a device that functions as a gateway connected to the Internet and a corporate intranet within the first core network 40.

The security gateway SeGW 43 is a device that functions as a security gateway for establishing IPsec (Security Architecture for Internet Protocol) with the home base station 30.

The mobility management entity MME 44 is a device that connects to both the macro cell base station 30 and the signaling gateway SGW 41 within the first core network 40, performs movement management and authentication of individual mobile bodies 10 via the macro cell base station 30 and manages processing for setting packet communication data paths.

The quality control server QCS 45 is a device that performs quality management in the radio network according to the present invention and is equipped with functions as a communication policy and charging rules management device PCRF (Policy and Charging Rules Function). The quality control server QCS 45 is a control device that executes communication policy control for, for example, quality management (QoS: Quality of Service), and control pursuant to charging rules which are applied to the signaling gateway SGW 41 and the packet data network gateway PGW 42. Particularly, in this embodiment, the quality control server QCS 45 is configured so that it can execute a mobile body communication method according to the present invention.

The second core network EPC 50 includes a mobile services switching center MSC (Mobile Services Switching Center) 51, a gateway switching node GMSC (Gateway Mobile-services Switching Center) 52, a signaling gateway SGW 53, a packet data network gateway PGW 54, a mobility management entity MME 55, and a communication policy and charging rules management device PCRF 56.

The mobile services switching center MSC 51 is a device that controls connection to calls and controls services in order to provide mobile communication services.

The gateway switching node GMSC 52 is a switching station that receives calls to contract holders in the radio network from an external network or to subscribers who are roaming in the radio network.

The signaling gateway SGW 53 is a device that functions as a gateway handling a user plane for customer data in the second core network 50.

The packet data network gateway PGW 54 is a device that functions as a gateway connected to the Internet and a corporate intranet within the second core network 50.

The mobility management entity MME 55 is a device that performs movement management and authentication of individual mobile bodies 10 and manages processing for setting packet communication data paths within the second core network 50.

The communication policy and charging rules management device PCRF 56 is a control device that executes communication policy control for, for example, quality management (QoS: Quality of Service), and control pursuant to charging rules which are applied to the signaling gateway SGW 53 and the packet data network gateway PGW 54.

The IP multimedia subsystem IMS (IP Multimedia Subsystem) 60 is a system for executing communication control by Internet Protocol and is a base system that handles voice calls and multimedia services by VoIP. When there is an outgoing call, which is a voice call, from the mobile unit 10, outgoing and incoming of a VoLTE call is started between the mobile unit 10 and the relevant IMS 60; and when the voice call terminates, outgoing and incoming of the VoLTE call is released.

Basic Operation of Mobile Body Communication System (Mobile Body Communication Method)

Next, the basic operation of the mobile body communication system 1 according to this embodiment will be explained. (Quality Management Parameters) QCIs (QoS Class Identifiers) are set according to the LTE standard as parameters for controlling the quality of sessions on the radio network side and the core network side. A session is also called DB (Default Bearer) and is a virtual conceptual unit indicative of how data from a mobile unit is handled during communication between the networks. Each of the QCI parameters defines one session and nine levels of priorities are set according to, for example, whether the bandwidth is controlled or not, permissible delay time, and packet loss rate.

FIG. 9 illustrates a list of the QCI parameters. Referring to FIG. 9, QCI1 to QCI4 are GBR (Guaranteed Bit Rate) whose bandwidth is guaranteed; and QCI5 to QCI9 are Non-GBR whose bandwidth is not guaranteed. The communication policy and charging rules management device PCRF of the core network is designed so that the QCI parameters can be set according to the communication quality in the radio network. Specifically speaking, the QCI parameters are set to the packet data network gateway PGW via a Gx interface and the packet data network gateway PGW is designed to generate sessions corresponding to the QCI parameters with the customer premises equipment CPE on the home base station. A session is called DB (Default Bearer or Dedicated Bearer) and each session can secure a certain communication traffic volume with the bandwidth, permissible delay, and bit loss defined by the QCIs.

(Operation Principles) The problem under this circumstance is that the communication policy and charging rules management device PCRF on the core network side cannot recognize the communication traffic volume or the number of calls of the mobile units on the radio network side, for example, at the home base station. An appropriate number of sessions cannot be added or released at appropriate timings unless the communication traffic volume or the number of calls of the mobile units at the home base station HeNB can be recognized.

So, in this embodiment, the above-described problem is solved by configuring the home base station 20 so that it can transmit a session generation request CReq to add a session or a session release request DReq to release a session to the quality control server 45 which operates as the communication policy and charging rules management device PCRF according to a special protocol.

In other words, when the quality control server QCS 45 in the mobile body communication system 1 according to this embodiment receives a session generation request CReq from the home base station 20, it operates to generate a session between the home base station 20 and the macro cell base station 30. Furthermore, when the quality control server QCS 45 in the mobile body communication system 1 according to this embodiment receives a session release request DReq from the home base station 20, it operates to release the session between the home base station 20 and the macro cell base station 30.

Specifically speaking, when the quality control server QCS 45 receives the session generation request CReq, it operates to generate an additional session by controlling the packet data network gateway PGW 42.

Furthermore, when the quality control server QCS 45 receives the above-described session release request DReq, it operates to release the session by controlling the packet data network gateway PGW 42. For example, as illustrated in FIG. 1, the packet data network gateway PGW 42 is controlled via the Gx interface to additionally generate or release the session.

Furthermore, when the quality control server QCS 45 receives a session change request DMReq from the home base station 20 in association with an increase in the number of calls from the mobile body 10a, it increases the guaranteed bandwidth for the session. Furthermore, when the quality control server QCS 45 receives a session change request DMReq from the home base station 20 in association with a decrease in the number of calls from the mobile body 10a, it decreases the guaranteed bandwidth for the session.

Under this circumstance, when a call from the mobile body 10a starts, the home base station 20 according to this embodiment transmits the above-described session generation request CReq. Furthermore, when the call from the mobile body 10a terminates, the home base station 20 according to this embodiment transmits the above-described session release request DReq.

Furthermore, when the number of calls from the mobile unit 10a increases, the home base station 20 transmits the session change request DMReq to the quality control server QCS 45 in association with the increase in the above-described number of calls. Furthermore, when the number of calls from the mobile unit 10a decreases, the home base station 20 transmits the session change request DMReq to the quality control server QCS 45 in association with the decrease in the above-described number of calls.

Furthermore, when the quality control server QCS 45 fails to communicate with the home base station 20, it releases the established session. This control is also performed via the Gx interface.

Specific Example of Operation Sequence

Next, a specific operation sequence of the mobile body communication system 1 according to this embodiment will be explained in order with reference to FIG. 2 to FIG. 8. Control indicated with bolded outlined arrows in FIG. 2 to FIG. 8 is new in this embodiment.

Figure 2:
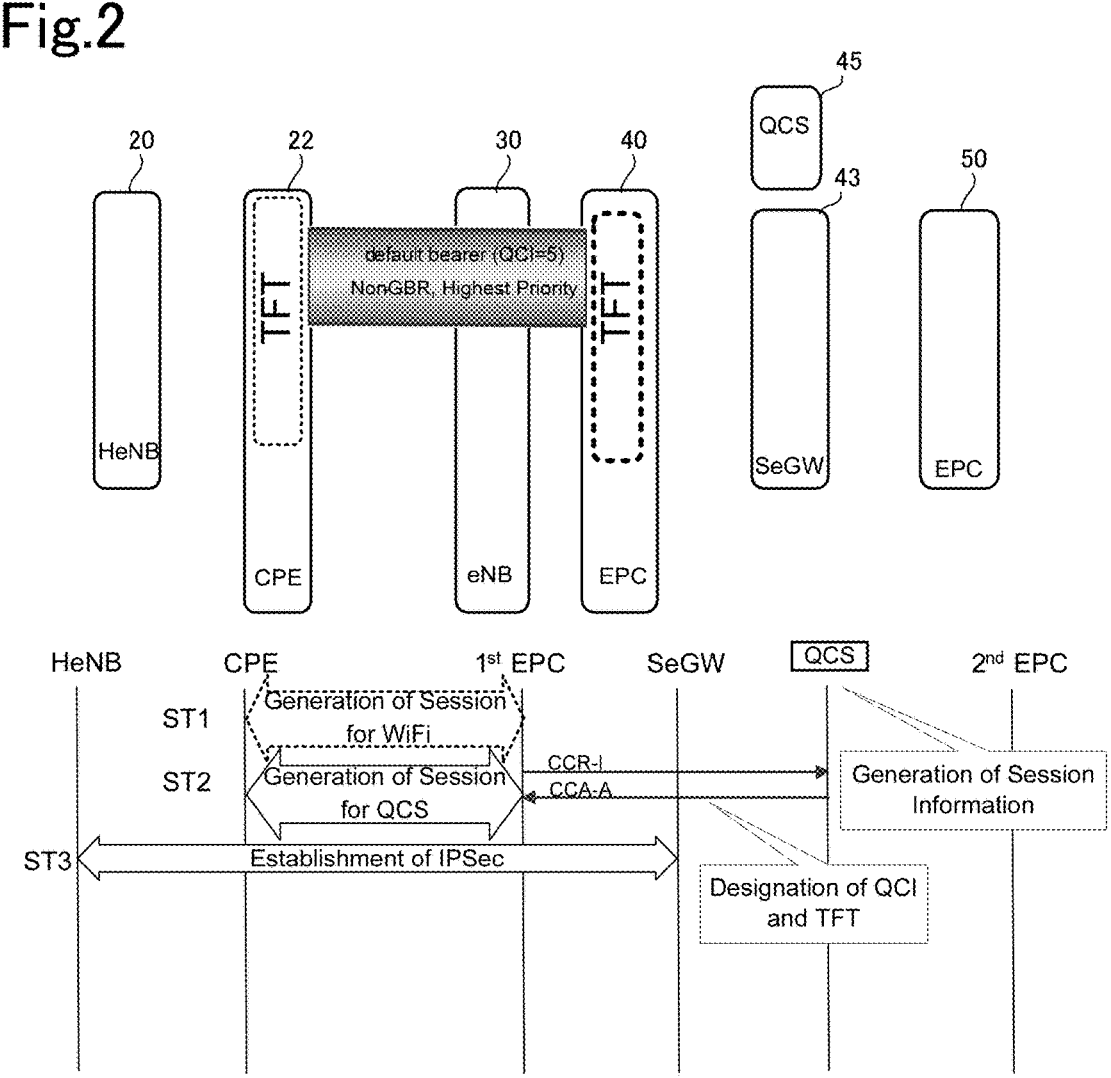
FIG. 2 illustrates a sequence diagram for explaining procedures for IPsec establishment according to the embodiment.

FIG. 2 illustrates a sequence diagram for explaining procedures for IPsec establishment. For example, FIG. 2 can illustrate the start of connection to establishment of IPsec. IPsec is a protocol to assign a secrecy function to packet communication on a packet data basis. Each step illustrated in FIG. 2 is set at the first stage of the packet communication in a manner no different from conventional steps.

(ST1: Generation of Session for Wifi) When a mobile unit 10 which performs only Wifi communication is connected to the customer premises equipment 22, a session for Wifi is firstly generated although it is not illustrated in FIG. 2. A session with relatively low priority which permits some data delay such as a session based on the parameter QCI9 is used as the session for Wifi.

(ST2: Generation of Session for Quality Management) When the customer premises equipment 22 connects to the first core network 40 via the macro cell base station 30, a session generation request CCR-I (Credit Control Request-Instruction) is transmitted to the quality control server QCS 45, which operates as the communication policy and charging rules management device PCRF, in the first core network 40. The quality control server QCS 45 checks the position of the home base station 20 and authenticates it in response to the session generation request CCR-I and returns CCR-A (CCR-Acknowledge) indicative of an approval of connection. When this happens, together with the CCR-A, the parameter QCI5, which is designated with the highest priority 1 to start communication with the IMS 60, and a TFT (Traffic Template) including session information are designated.

(ST3: Establishment of IPsec) The packet data network gateway PGW 42 starts generating a session according to the parameter QCI5 in response to the CCR-A. At the same time, the security gateway SeGW 43 establishes the IPSec in accordance with an encryption method, encryption key, and security protocol for the relevant session. When the session according to the parameter QCI5 (hereinafter represented as "DB5") is established, control data can be transmitted and received.

Figure 3:
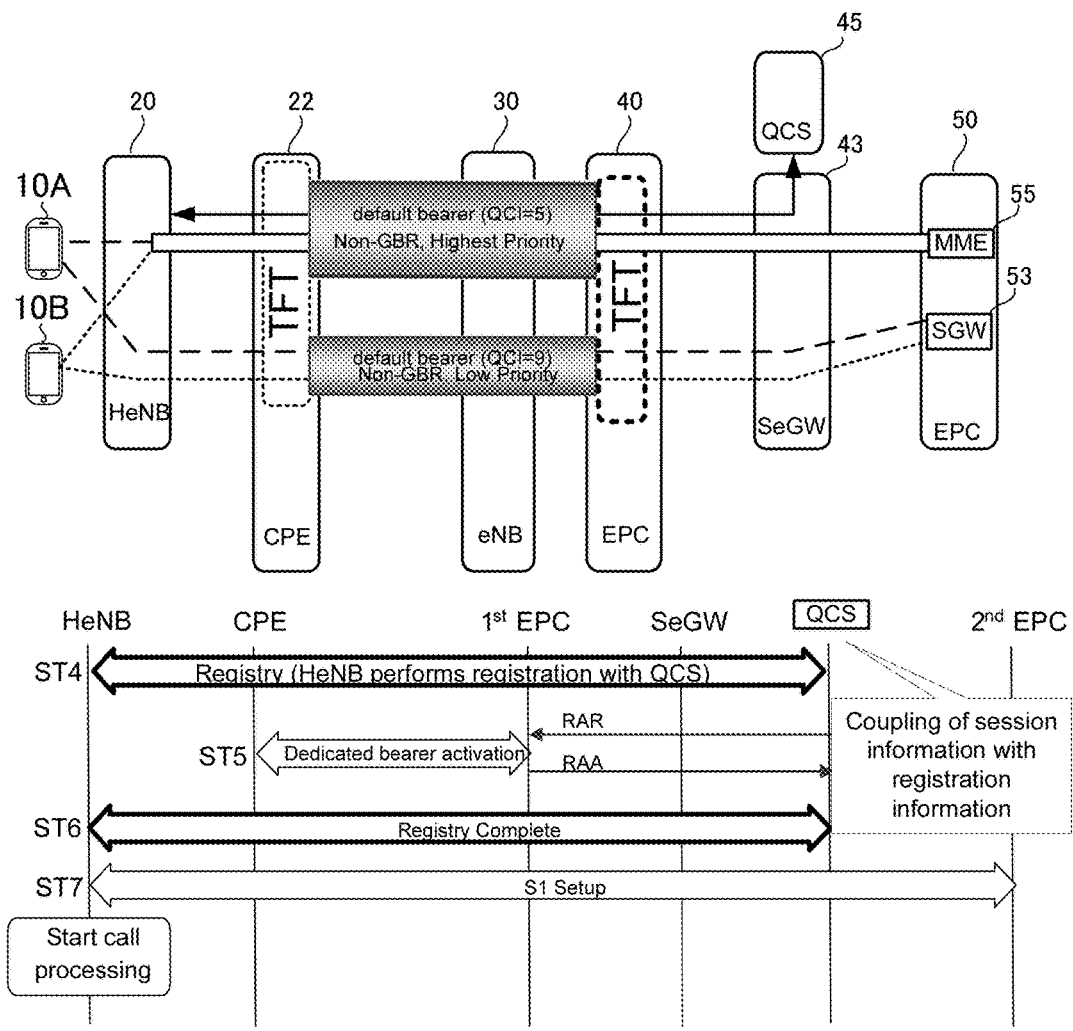
FIG. 3 illustrates a sequence diagram for explaining procedures for generating a session for data communication according to the embodiment.

FIG. 3 illustrates a sequence diagram for explaining procedures for additionally generating a session for data communication. For example, FIG. 3: can illustrate generation of session for data communication after the IPsec is established.

(ST4: Request for Registration of Mobile Unit) When the home base station 20 detects connection of a mobile unit 10a, the home base station 20 transmits a request for registration of the mobile unit 10a to the first core network 40 via the customer premises equipment CPE 22 and the macro cell base station 30. After receiving the registration request, the quality control server QCS 45 checks the position of, and authenticates, the mobile unit 10a connected to the home base station 20. As the mobile unit 10a is registered on the core network side, it becomes possible for the mobility management entity MME 55 to manage its movements.

(ST5: Generation of Session for Data Communication) Having received the registration request from the home base station 20, the quality control server QCS 45 transmits a router advertisement request RAR to generate a session for data communication. In response to this request, the packet data network gateway 42 generates a data communication session DB9 and returns a router advertisement acknowledge RAA.

(ST6: Completion of Generation of Data Communication Session) After the processing for registering the mobile unit 10a in the quality control server QCS 45 is completed, the home base station 20 reports the completion of generation of the data communication session to the quality control server QCS 45 (ST6).

As a result of the above-described processing, packet data of the mobile unit 10a can be transmitted to the second core network 50 via the session DB9. Furthermore, if settings using the S1 interface are implemented, it becomes possible to accept call processing from the mobile unit 10a.

Figure 4:
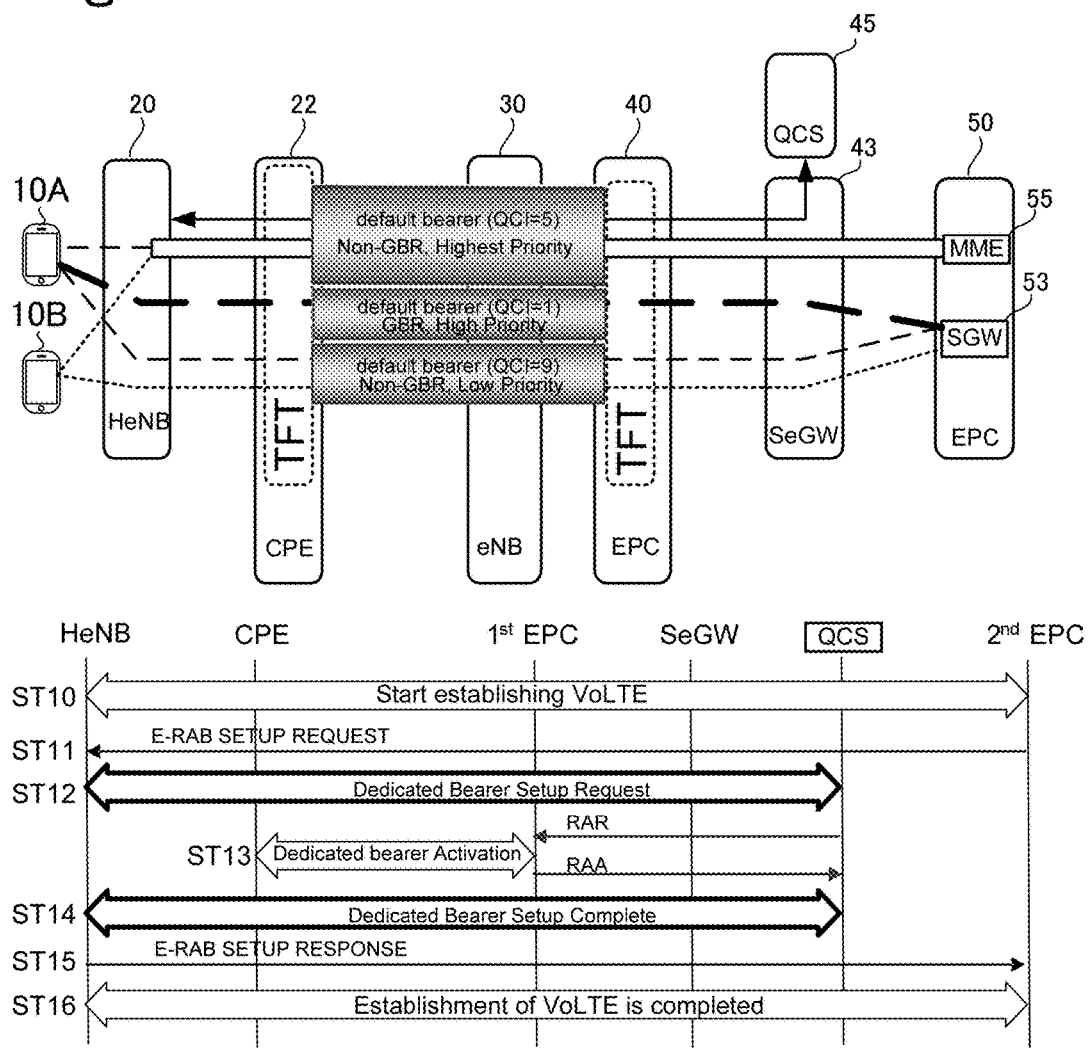
FIG. 4 illustrates a sequence diagram for explaining procedures for further generating a session for voice communication according to the embodiment.

FIG. 4 illustrates a sequence diagram for explaining procedures for further generating a session for voice communication. For example, FIG. 4 can illustrate generation of session for voice communication. As another example, further generating the session for voice communication can occur after the data communication session DB9 is established. Under this circumstance, it is assumed that only the mobile unit 10A from among the mobile units 10A and 10B illustrated in FIG. 4 makes outgoing calls.

(ST10: Start of Establishment of VoLTE) After an outgoing call is made by the mobile unit 10A, VoLTE call incoming and outgoing processing is started between the mobile unit 10A and the IP multimedia subsystem IMS 60 (see FIG. 1).

(ST11: Request for Generation of Voice Communication Session) After the VoLTE call incoming and outgoing processing is started, an E-RAB (E-UTRAN Radio Access Bearer) generation request to request the start of voice communication is transmitted from the IMS 60 to the home base station 20.

(ST12: Start of Generation of Voice Communication Session) After receiving the E-RAB generation request, the home base station 20 transmits the session generation request CReq to the quality control server QCS 45. This session generation request CReq is to request the addition of a voice communication session between the customer premises equipment CPE 22 and the first core network 40.

(ST13: Generation of Voice Communication Session) After receiving the session generation request CReq from the home base station 20, the quality control server QCS 45 transmits an opening request RAR to generate a voice communication session via the Gx interface used for the management of communication rules. In response to this request, the packet data network gateway 42 generates a voice communication session DB1 and returns an opening approval RAA.

(ST14: Completion of Generation of Voice Communication Session) When a change of sessions including the voice communication session DB1 is completed, the home base station 20 reports the completion of generation of the voice communication session to the quality control server QCS 45. Furthermore, the home base station 20 returns an E-RAB generation completion, which reports the completion of generation of the voice communication, to the core network side (ST15). As a result of the above-described processing, the VoLTE is established between the mobile unit 10A connected to the home base station 20 and the core network side.

(ST16: Completion of Establishment of VoLTE) When the processing required for the voice communication by the VoLTE is completed, the VoLTE call incoming and outgoing processing between the home base station 20 and the IMS 60 is completed, thereby enabling the voice communication from the mobile unit 10A via the core network.

Figure 5:
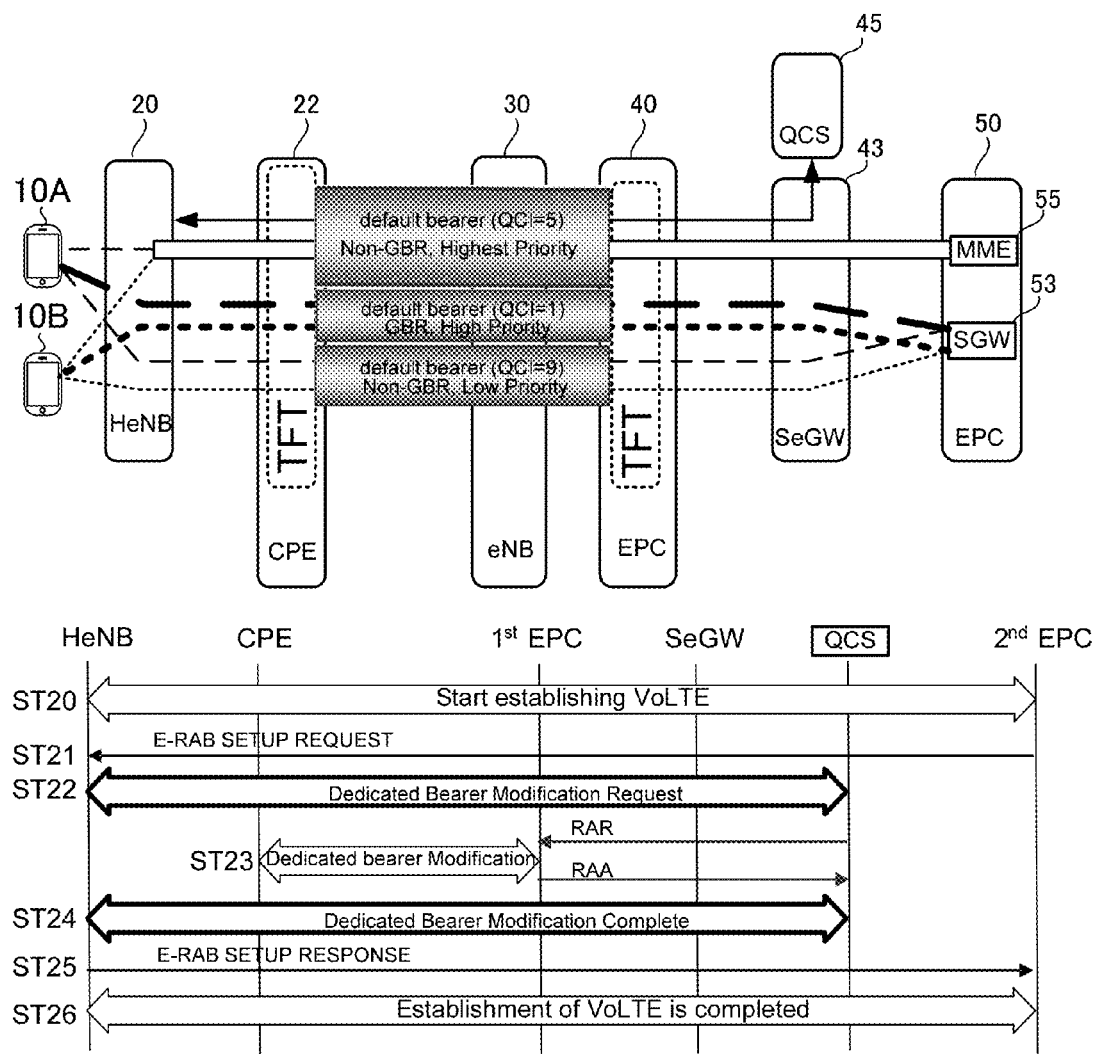
FIG. 5 illustrates a sequence diagram for explaining procedures for increasing a guaranteed bandwidth of the session for voice communication according to the embodiment.

FIG. 5 illustrates a sequence diagram for explaining procedures for increasing the guaranteed bandwidth of the session for voice communication. For example, FIG. 5: can illustrate the increase of bandwidth for a voice communication session. In another example, the procedures for increasing the bandwidth for the voice communication session in response to an increase in the number of calls from the mobile unit after the data communication session DB1 is established. In FIG. 4 described above, there are outgoing and incoming calls from only the mobile unit 10A; however, under this circumstance, FIG. 5 illustrates a case where there are outgoing and incoming calls also from the mobile unit 10B.

(ST20: Start of Establishment of VoLTE) When an outgoing call is made from the mobile unit 10B following the mobile unit 10A, the VoLTE call incoming and outgoing processing is started between the mobile unit 10B and the IMS 60 (see FIG. 1) this time.

(ST21: Voice Communication Session Generation Request) When the VoLTE call incoming and outgoing processing for the mobile unit 10B is started, an E-RAB generation request to request the start of voice communication with respect to the mobile unit 10B is transmitted from the IMS 60 to the home base station 20.

(ST22: Start of Generation of Voice Communication Session) After receiving the E-RAB generation request for the mobile unit 10B, the home base station 20 transmits a session change request CMReq to the quality control server QCS 45 to increase the bandwidth for the session this time. This session change request CMReq is to request the increase of the guaranteed bandwidth for the voice communication session DB1 established between the customer premises equipment CPE 22 and the first core network 40.

(ST23: Increase of Bandwidth for Voice Communication Session) After receiving the session change request CMReq from the home base station 20, the quality control server QCS 45 transmits a change request RAR via the Gx interface to increase the guaranteed bandwidth of the voice communication session DB1. In response to this request, the packet data network gateway 42 increases the guaranteed bandwidth for the voice communication session DB1 and returns a change approval RAA.

(ST24: Completion of Change of Voice Communication Session) When the bandwidth change for the voice communication session DB1 is completed, the home base station 20 reports the completion of the change of the voice communication session to the quality control server QCS 45. Furthermore, the home base station 20 returns an E-RAB change completion, which reports the completion of the change of the voice communication, to the core network side (ST25). As a result of the above-described processing, the VoLTE is established between the mobile unit 10B, which made the new outgoing call to the home base station 20, and the core network side.

(ST26: Completion of Establishment of VoLTE) When the processing required for the voice communication by the VoLTE with respect to the mobile unit 10B is completed, the VoLTE call incoming and outgoing processing between the home base station 20 and the IMS 60 is completed, thereby enabling the voice communication from the mobile unit 10B via the core network.

It is possible to arbitrarily set how the guaranteed bandwidth of the voice communication session DB1 should be increased according to the increase in the number of calls from the mobile unit 10a. For example, the guaranteed bandwidth may be increased every time the number of calls increases by one; or the guaranteed bandwidth may be increased when the number of calls increases by a certain set number of calls. It is more advantageous to frequently increase the guaranteed bandwidth because compression on resources for the mobile unit 10b directly connected to the home base station 20 can be reduced, but this has the disadvantage of increasing the amount of processing. Contrarily, it is advantageous to increase the guaranteed bandwidth in a larger unit because the amount of processing can be reduced, but this has the disadvantage of increasing the compression on the resources for the mobile unit 10b directly connected to the home base station 20. An appropriate method for increasing the bandwidth should be set as appropriate in consideration of the advantages and disadvantages.

Figure 6:
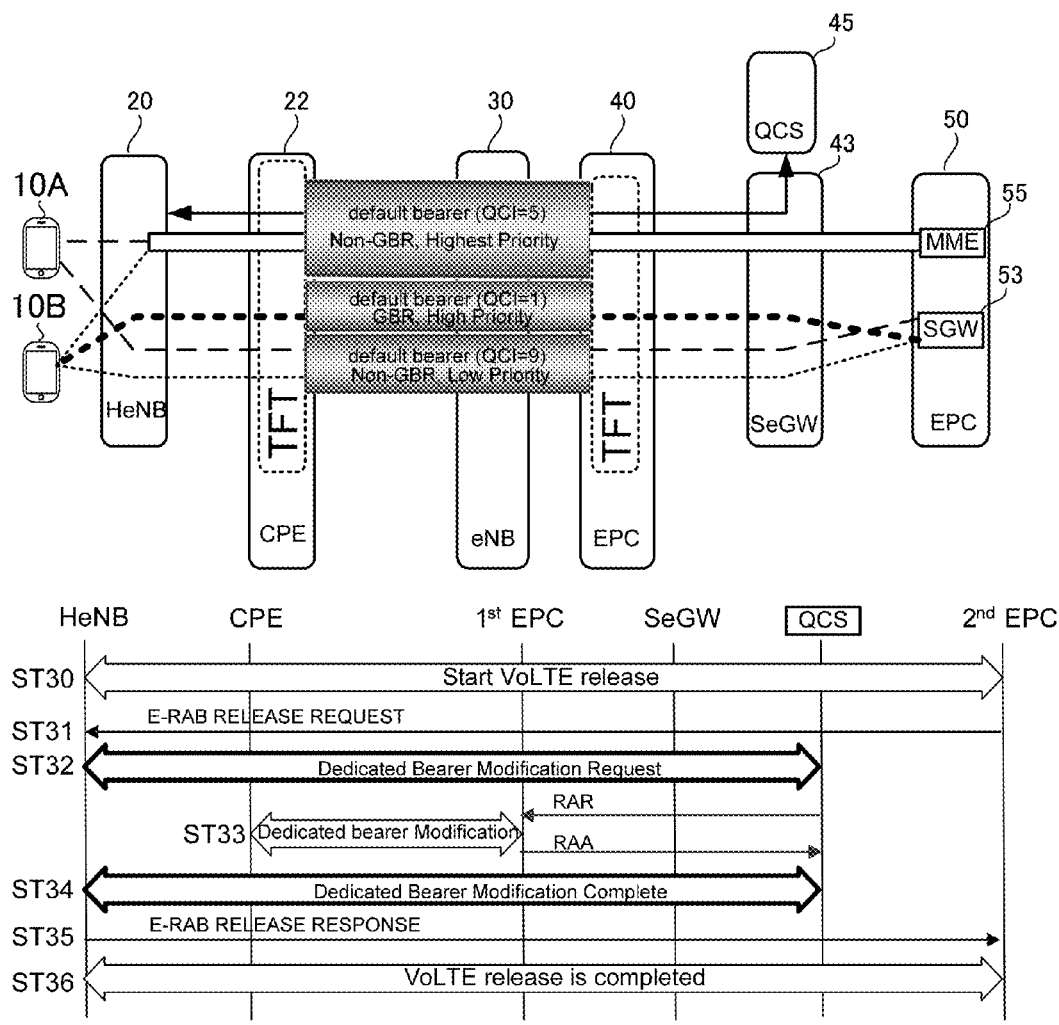
FIG. 6 illustrates a sequence diagram for explaining procedures for decreasing the guaranteed bandwidth of the session for voice communication according to the embodiment.

FIG. 6 illustrates a sequence diagram for explaining procedures for decreasing the guaranteed bandwidth of the session for voice communication. For example, FIG. 6 can illustrate procedures for decreasing the bandwidth for the voice communication session according to a decrease in the number of calls from the mobile unit. In FIG. 5 described above, there are outgoing and incoming calls from both the mobile unit 10A and the mobile unit 10B; however, under this circumstance, FIG. 6 illustrates a case where the outgoing and incoming call from the mobile unit 10A terminates.

(ST30: Start of Release of VoLTE) When the outgoing and incoming call from the mobile unit 10A terminates following the completion of the VoLTE establishment with the mobile unit 10B, processing for releasing the VoLTE call established between the mobile unit 10A and the IMS 60 (see FIG. 1) is started.

(ST31: Request for Release of Voice Communication Session) When the processing for releasing the VoLTE call with respect to the mobile unit 10A is started, an E-RAB release request to request the termination of the voice communication with respect to the mobile unit 10A is transmitted from the IMS 60 to the home base station 20.

(ST32: Start of Change of Voice Communication Session) After receiving the E-RAB release request for the mobile unit 10A, the home base station 20 then transmits a session change request CMReq to the quality control server QCS 45 to decrease the bandwidth for the session. This session change request CMReq is to request the decrease of the guaranteed bandwidth for the voice communication session DB1 which has already been established between the customer premises equipment CPE 22 and the first core network 40 and operated with the guaranteed bandwidth that matches voice calls from the plurality of mobile units 10.

(ST33: Decrease of Bandwidth for Voice Communication Session) After receiving the session change request CMReq from the home base station 20, the quality control server QCS 45 transmits a change request RAR via the Gx interface to decrease the guaranteed bandwidth of the voice communication session DB1. In response to this request, the packet data network gateway 42 decreases the guaranteed bandwidth of the voice communication session DB1 and returns a change approval RAA.

(ST34: Completion of Change of Voice Communication Session) When the bandwidth change for the voice communication session DB1 is completed, the home base station 20 reports the completion of the change of the voice communication session to the quality control server QCS 45. Furthermore, the home base station 20 returns an E-RAB change completion, which reports the completion of the change of the voice communication, to the core network side (ST35).

(ST36: Completion of Release of VoLTE) When the processing required for the release of the VoLTE call with respect to the mobile unit 10A is completed, the processing for releasing the VoLTE call which has been established between the home base station 20 and the IMS 60 with respect to the mobile unit 10A is completed, thereby terminating the voice communication from the mobile unit 10A.

It is possible to arbitrarily set how the guaranteed bandwidth of the voice communication session DB1 should be decreased according to the decrease in the number of calls from the mobile unit 10a. For example, the guaranteed bandwidth may be decreased every time the number of calls decreases by one; or the guaranteed bandwidth may be decreased when the number of calls decreases by a certain set number of calls. It is more advantageous to frequently decrease the guaranteed bandwidth because the compression on the resources for the mobile unit 10b directly connected to the home base station 20 can be reduced, but this has the disadvantage of increasing the amount of processing. Contrarily, it is advantageous to decrease the guaranteed bandwidth in a larger unit because the amount of processing can be reduced, but this has the disadvantage of increasing the compression on the resources for the mobile unit 10b directly connected to the home base station 20. An appropriate method for decreasing the bandwidth should be set as appropriate in consideration of the advantages and the disadvantages.

Figure 7:
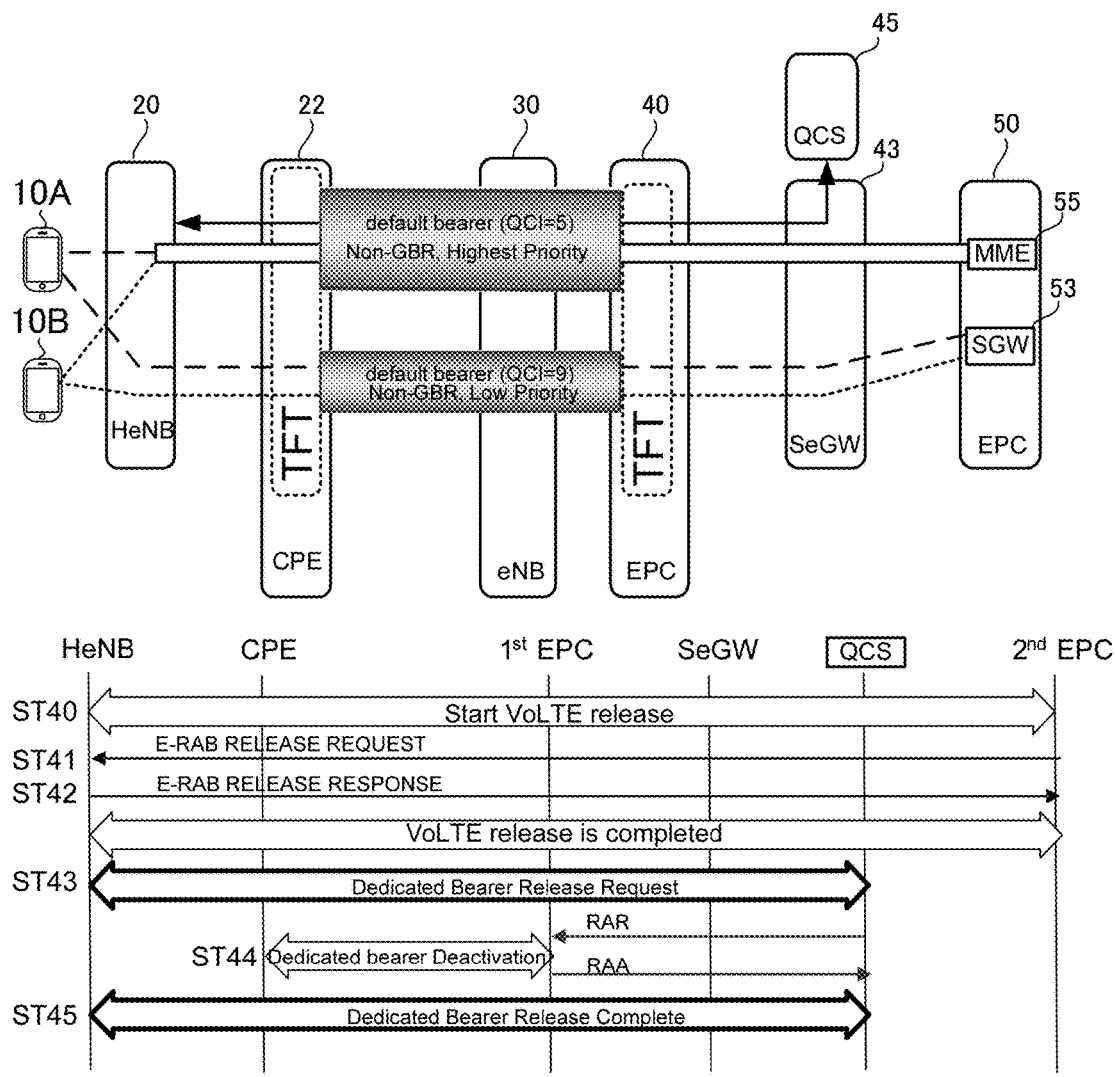
FIG. 7 illustrates a sequence diagram for explaining procedures for releasing the session according to the embodiment.

FIG. 7 illustrates a sequence diagram for explaining procedures for releasing the voice communication session. For example, FIG. 7 can illustrate procedures for releasing the voice communication session for a voice phone call.

(ST40: Start of Release of VoLTE) When the voice communication of the mobile unit 10B terminates following that of the mobile unit 10A, the home base station 20 reports the termination of the voice communication with respect to the mobile unit 10B to the core network. An E-RAB release request to request the release of the VoLTE call is transmitted from the core network side (ST41). In response to this request, the home base station 20 returns an E-RAB release response to approve the release of the VoLTE call (ST42). As a result, the release of the VoLTE call established between the home base station 20 and the IMS 60 with respect to the mobile unit 10B is completed.

(ST43: Request for Release of Voice Communication Session) After the voice communication from all the mobile units 10 terminates, the home base station 20 makes a request to the core network for the release of the session relating to the voice communication. In response to the session release request from the home base station 20, the quality control server QCS 45 transmits a release request RAR via the Gx interface to release the voice communication session DB1. In response to this request, the packet data network gateway 42 releases the voice communication session DB1 and returns a release approval RAA (ST44).

(ST45: Completion of Release of Session) When the release of the voice communication session DB1 is completed, the home base station 20 reports the completion of release of the voice communication session to the quality control server QCS 45. As a result, the entire processing for releasing the voice communication session is terminated.

Figure 8:
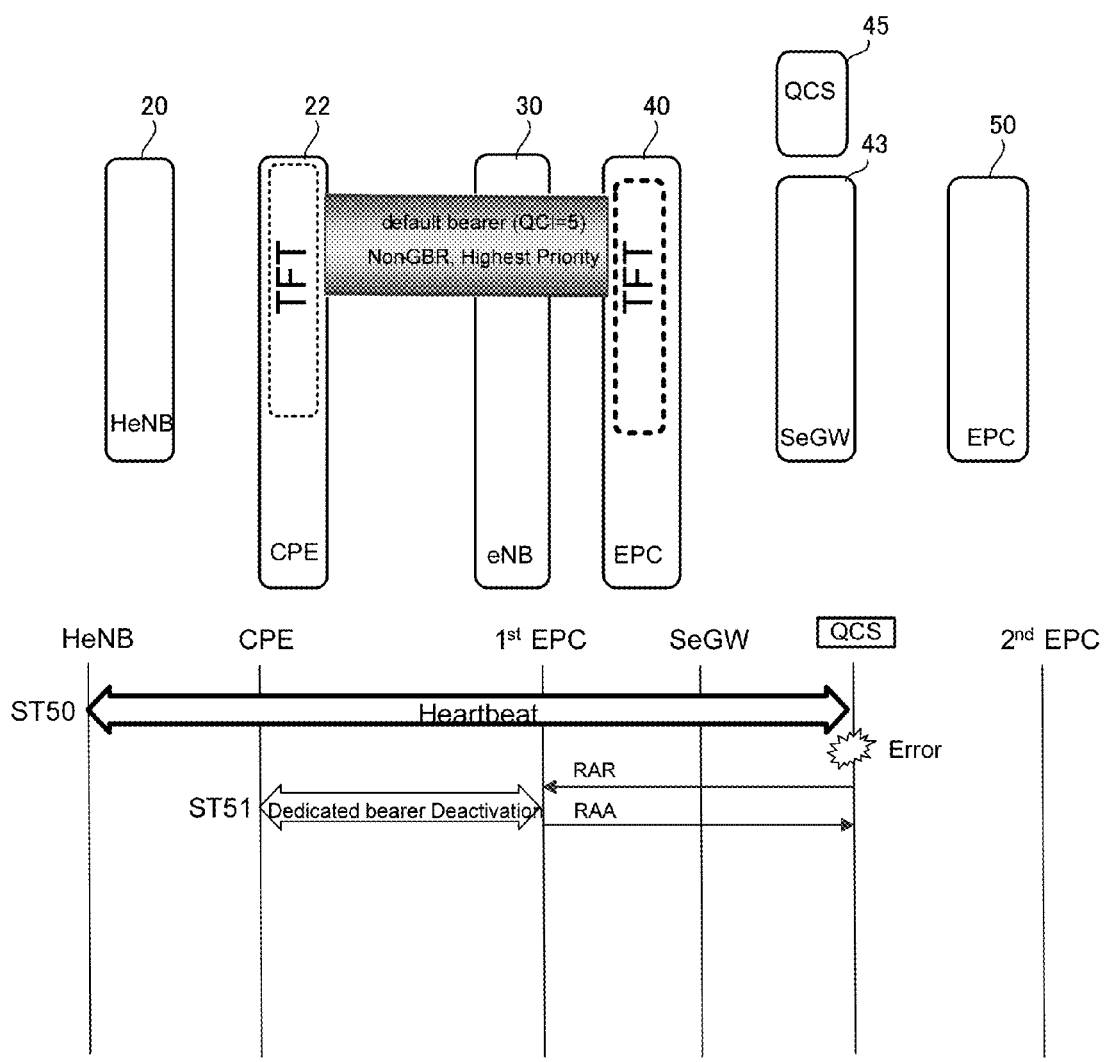
FIG. 8 illustrates a sequence diagram for explaining procedures for releasing a session when the communication with the home base station fails according to the embodiment.

FIG. 8 illustrates a sequence diagram for explaining procedures for releasing a session when communication with the home base station 20 fails. For example, FIG. 8 can illustrate critical judgment of the home base station.

A session is released based on a request from the home base station 20. So, if the home base station 20 should become dysfunctional due to a local circumstance such as a failure, the session which has been established once will continue to be used and the resources for the mobile unit 10b directly connected to the macro cell base station 30 will remain limited. Therefore, in this embodiment, whether the home base station 20 is functional or not is judged according to the following sequence; and when it is determined that the home base station 20 is not functional, the session is released.

(ST50: Critical Judgment) The quality control server QCS 45 executes communication with the home base station 20 regularly or irregularly. When the communication from the home base station 20 has ceased, for example, when a response to an inquiry from the quality control server QCS 45 has not been returned for a specified period of time or no response has been obtained for a specified number of inquiries, the quality control server QCS 45 determines that the home base station 20 has become dysfunctional.

(ST51: Release of Session) When it is determined that the home base station 20 has become dysfunctional, the quality control server QCS 45 transmits a release request RAR to release the data communication session DB9 and the voice communication session DB1. In response to this request, the packet data network gateway 42 releases all the sessions established with the home base station 20 and returns a release approval RAA to the quality control server QCS 45.

As a result of the above-described processing, all the sessions generated by the home base station 20 which has become dysfunctional are released, so that the resources for the mobile unit 10b directly connected to the macro cell base station 30 are secured. Furthermore, when the relevant home base station 20 has become dysfunctional, the mobile unit 10a which is present in the area of the home base station 20 will be directly connected to the macro cell base station 30 or connected via another home base station 20, thereby securing communication.

Advantageous Effects of this Embodiment

With the mobile body communication system according to the embodiment as explained above, when the number of calls from the mobile body 10a to the home base station 20 has increased, the guaranteed bandwidth for the session between the macro cell base station 30 and the home base station 20 is increased. Therefore, the communication quality of the mobile body 10a connected to the home base station 20 can be guaranteed.

On the other hand, when the number of calls from the mobile body 10a to the home base station 20 has decreased, the guaranteed bandwidth for the session established between the macro cell base station 30 and the home base station 20 is decreased. Therefore, many resources can be allocated to the communication between the macro cell base station 30 and the mobile body 10b and the communication quality of the mobile body 10b directly connected to the macro cell base station 30 can be guaranteed.

Furthermore, when the home base station 20 has failed for whatever reasons and has become dysfunctional, the already-established sessions are released, making it possible to avoid wasteful resource allocation.

Other Embodiments

The present invention has been described by referring to the embodiment as described above; however, it should not be understood that the descriptions and diagrams which constitute part of this disclosure limit this invention. This disclosure should make various substitute embodiments, examples, and operation technologies apparent to those skilled in the art.

For example, the aforementioned embodiment has illustratively explained the case in which a data communication session is added, by referring to FIG. 3 and has illustratively explained the case in which a voice communication session is added, by referring to FIG. 4; however, the invention is not limited to these examples. Furthermore, the case in which the bandwidth for the voice communication session is increased has been illustratively explained by referring to FIG. 5; and the case in which the bandwidth for the voice communication session is decreased has been illustratively explained by referring to FIG. 6; however, the invention is not limited to these examples. Furthermore, the case in which the voice communication session is released has been illustratively explained by referring to FIG. 7; however, the invention is not limited to this example. It is a matter of course that an arbitrary session can be added or released depending on an increase or decrease in the number of calls from the mobile unit 10a existing in the area of the home base station 20 and the status of communication at the mobile unit 10a and that the guaranteed bandwidth for the arbitrary session can be increased or decreased.

Furthermore, the configuration of the radio network side and the core network side in the aforementioned embodiment is one example and cannot be recognized as limiting the present invention. In fact, the mobile body communication method of the present invention can be applied to a system in which devices on the core network side are configured to be capable of controlling generation and release of sessions and increase and decrease of the bandwidth in the radio network according to a report from devices on the radio network side which are capable of perceiving the communication traffic volume at the mobile units.

Similarly, the aforementioned embodiment has illustratively described the mobile body communication system according to the LTE standard; however, without limitation to such standard, the present invention can be applied to other communication standards and communication standards which will be set in the future.

REFERENCE SIGNS LIST

1: mobile body communication system
10: mobile unit
20: home base station (HeNB: Home eNodeB)
22: customer premises equipment CPE (Customer Premises Equipment)
30: macro cell base station (eNB: eNodeB)
40: first core network EPC (Evolved Packet Core)
41: signaling gateway SGW (Signaling Gateway)
42: packet data network gateway PGW (Packet Data Network Gateway)
43: security gateway SeGW (Security Gateway)
44: mobility management entity MME (Mobility Management Entity)
45: quality control server QCS (Quality Control Server)
50: second core network EPC
51: mobile services switching center MSC (Mobile Services Switching Center)
52: gateway switching node GMSC (Gateway Mobile-services Switching Center)
53: signaling gateway SGW
54: packet data network gateway PGW
55: mobility management entity MME
56: communication policy and charging rules management device PCRF (Policy and Charging Rules Function)
60: IP multimedia subsystem IMS (IP Multimedia Subsystem)

The invention claimed is:

1. A mobile body communication system comprising:
a home base station configured to control radio communication with a mobile unit;
a macro cell base station configured to control radio communication with one or more mobile units and radio communication with the home base station; and
a quality control server connected to the macro cell base station, configured to:
manage communication quality between the macro cell base station and the home base station,
generate a session between the home base station and the macro cell base station when receiving a session generation request from the home base station; and release the session between the home base station and the macro cell base station when receiving a session release request from the home base station, wherein the quality control server is configured to transmit a release request to release the generated session when the quality control server determines that communication between the home base station and the quality control server fails, and in response to the release request, a packet data network gateway releases the generated session and returns a release approval to the quality control server.

2. The mobile body communication system according to claim 1, further comprising the packet data network gateway connected to the macro cell base station, wherein the quality control server is configured to: generate the session by controlling the packet data network gateway when receiving the session generation request; and release the session by controlling the packet data network gateway when receiving the session release request.

3. The mobile body communication system according to claim 1, wherein the home base station is configured to: transmit the session generation request to the quality control server when a call from the mobile unit starts; and transmit the session release request to the quality control server when the call from the mobile unit terminates.

4. The mobile body communication system according to claim 1, wherein the quality control server is configured to: increase a guaranteed bandwidth of the session when receiving a session change request from the home base station in association with an increase in the number of calls from the mobile body; and decrease the guaranteed bandwidth of the session when receiving a session change request from the home base station in association with a decrease in the number of calls from the mobile body.

5. The mobile body communication system according to claim 4, wherein the home base station is configured to: transmit the session change request to the quality control server in association with the increase in the number of calls when the number of calls from the mobile unit has increased; and transmit the session change request to the quality control server in association with the decrease in the number of calls when the number of calls from the mobile unit has decreased.

6. A mobile body communication method comprising:

controlling, with a home base station, radio communication with a mobile unit;

controlling, with a macro cell base station, radio communication with one or more mobile units and radio communication with the home base station;

controlling the macro cell base station with a core network, generating a session between the home base station and the macro cell base station in the core network when a session generation request is received from the home base station;

determining whether communication with the home base station fails; and transmitting a release request to release the generated session when it is determined that communication with the home base station fails, wherein in response to the release request, a packet data network gateway releases the generated session.

* * * * *